United States Patent

[11] 3,608,075

| [72] | Inventors | William L. Glen<br>Baie D'Urfe, Quebec, Canada;<br>Max Gahwyler, Darien, Conn. |
|---|---|---|
| [21] | Appl. No. | 845,488 |
| [22] | Filed | July 28, 1969 |
| [45] | Patented | Sept. 21, 1971 |
| [73] | Assignee | American Home Products Corporation<br>New York, N.Y. |

[54] COMPOSITIONS AND METHODS OF TREATING THE MENOPAUSAL SYNDROME
10 Claims, No Drawings

[52] U.S. Cl. .................................................. 424/238
[51] Int. Cl. ....................................................... A61k 17/06
[50] Field of Search ............................................ 424/100, 238

[56] References Cited
UNITED STATES PATENTS

| 2,429,398 | 10/1947 | Cook et al. | 424/100 |
| 2,551,205 | 5/1951 | Cook et al. | 424/100 |
| 2,696,265 | 12/1954 | Beall et al. | 424/100 |
| 2,834,712 | 5/1958 | Beall et al. | 424/100 |

OTHER REFERENCES

Carol et al., J. Pharm. Sci. 50(7): 550-5 July 1961 "Analysis Of Conjugated Estrogen Preparations"

*Primary Examiner*—Shep K. Rose
*Attorneys*—Vita Victor Bellino, Andrew Kapko, Joseph Martin Weigman, Dwight J. Potter and Robert Wiser

ABSTRACT: A method and composition for treatment of the menopausal syndrome in women utilizing, as the treatment agent, a composition containing sodium $17\beta$-dihydroequilin sulfate as the sole estrogenic agent. Sodium $17\beta$-dihydroequilin sulfate may be administered orally or parenterally in the usual dosage forms and adverse side effects are virtually absent at effective dose levels.

COMPOSITIONS AND METHODS OF TREATING THE MENOPAUSAL SYNDROME

BACKGROUND OF INVENTION

The menopausal syndrome, which may also be called the climacteric, consists of a variety of unpleasant and often highly distressing symptoms involving any or all of the systems of the body, and results from hormonal imbalance, essentially from a deficiency of estrogens. Symptoms sufficiently severe to require therapy occur in approximately 50 percent of women, and it is now well known that estrogen therapy is most likely to be successful in alleviating the distressing symptoms of the menopause such as anxiousness, apprehension, mild depression, melancholia, irritability, emotional instability, impaired power of concentration and of memory, fatigue and insomnia. Other symptoms mostly associated with the menopause and usually equally benefited by estrogen therapy are disturbances of the autonomic nervous system such as, for example, hot flushes, excessive perspiration, heat intolerance, dizziness, headaches, and gastrointestinal or urinary dysfunction; certain disorders such as, for example, irregular bleeding or metrorrhagia, or atrophy of the vaginal mucosa; and certain other symptom such as arthralgias. When such symptoms occur during the menopause they may in most cases be classified as estrogen deficiency symptoms.

Many different estrogens have been used and are still being used in medicine for the treatment of the menopausal syndrome. Such estrogens include compounds or mixtures of compounds occurring in nature and isolated from natural sources, as well as semisynthetic and fully synthetic compounds. The group of naturally occurring estrogens comprises steroids of the estrane series with a phenolic ring A and a hydroxyl group in position 3, of various degrees of unsaturation, such as estrone, equilin, and equilenin, and their respective dihydro derivatives. Such steroids are usually insoluble in aqueous media and have to be administered parenterally, either in solution in oils or in suspensions. However, esterification with pharmaceutically acceptable acids which form water-soluble salts, preferably with sulfuric acid, makes such steroids highly water soluble in the form of the sodium salts of their respective sulfate esters, and such preparations are preferred for oral administration.

In the physiology of menstruation, estrogens will cause, among other effects, characteristic changes in the vaginal mucosa throughout the menstrual cycle, and proliferation of the uterine endometrium during the first half of the cycle with concomitant elongation of the endometrial glands and blood vessels. In the second half of the cycle, under the combined influence of estrogens and of progesterone elaborated by the corpus luteum, the endometrium continues to proliferate. The endometrial glands become progressively more dilated, tortuous, and secretory in character, while the blood vessels, especially the small arteries, show characteristically tight spiral forms. Finally, when the production of ovarian hormones has reached its peak level, it is suppressed by pituitary action. The endometrium, now deprived of its hormonal support, breaks down and menstruation results. A number of tests for determining the presence and efficacy of estrogens are based on the above phenomena.

For example, the characteristic changes in the vaginal mucosa caused by estrogens, especially the cornification of epithelial cells which may easily be seen under the microscope, are the basis for the quantitative Allen-Doisy test for estrogens in small rodents, preferably mice or rats. Similar changes may also be observed in the human female by vaginal cytology, and are equally useful for determining the presence and efficacy of estrogens.

The characteristic proliferation of the uterine endometrium caused by estrogens may be observed in the human female by endometrial biopsy or curettage. Furthermore, the human uterine endometrium which has proliferated under the influence of estrogens, usually breaks down fairly rapidly upon cessation of administration of estrogens, causing withdrawal bleeding, and this phenomenon is equally apt to demonstrate estrogenic activity. In small rodents, such as mice and rats, estrogen will cause a characteristic increase in weight of the uterus. This phenomenon is the basis of the assay method for the uterotropic activity of estrogens and is a function of their presence.

It is now also well known that estrogens cause suppression of pituitary gonadotrophin, and this phenomenon is being used for the determination of estrogens in the test method according to Biddulph et al., Endocrinology, Vol. 26, page 280 (1940) in parabiotic rats.

SUMMARY OF THE INVENTION

This invention relates to compositions for the treatment of the menopausal syndrome in women, and to methods for treating the symptoms associated with said syndrome. In particular, this invention relates to compositions containing sodium 17β-dihydroequilin sulfate as the sole estrogenic agent, and to methods for treating the menopausal syndrome by administering such compositions to women suffering from the symptoms associated usually with said syndrome.

DETAILED DESCRIPTION OF THE INVENTION

Sodium 17β-dihydroequilin sulfate used in the treatment of the menopausal syndrome may be readily prepared by reduction of sodium equilin sulfate by the action of sodium borohydride. The starting material, sodium equilin sulfate, may be prepared in accordance with the procedures described in U.S. Pat. No. 2,597,723, Grant and Glen, issued May 20, 1952, or in Canadian Pat. No. 515,432.

Sodium 17β-dihydroequilin sulfate is a useful estrogenic agent, effective upon oral administration. This is readily shown, for example, by the results secured in the Allen-Doisy test as published by Revesz and Chappel in Journal of Reproduction and Fertility, Vol. 12, page 473 (1966). The oral ED for sodium 17β-dihydroequilin sulfate was found to be from 11 to 13 micrograms per 300 grams of rat weight per day, the total dose for the test period of 3 days being from 32 to 39 micrograms, and 5 micrograms total dose per 30 grams of mouse weight. As a comparison in this test there was utilized a mixture of equine conjugated estrogens sold commercially under the trademark name "Premarin." This commercial preparation had $ED_{50}$ 100 microgram total dose in the rat and 4.5 micrograms total dose in the mouse.

Furthermore, in modifications of the assay methods for uterotropic activity in the mouse, as described by Rubin et. al. in Endocrinology, Vol. 49, page 429 (1951), and in the rat, as described by Dorfman and Dorfman, ibid. Vol. 55, page 68 (1954), the compound sodium 17β-dihydroequilin sulfate was found to be about as active orally as a mixture of equine conjugated estrogens ("Premarin").

In the test for gonadotrophin suppression in parabiotic rats according to Biddulph et al. cited above, the compound sodium 17β-dihydroequilin sulfate was found to be more active when administered orally than a mixture of equine conjugated estrogens ("Premarin").

We have now found that sodium 17β-dihydroequilin sulfite is surprisingly more potent as an orally active estrogen than an available mixture of equine conjugated estrogens ("Premarin") in the human female, giving excellent results at one-third to one-half of the dose of the latter, and also causes unexpectedly less objectionable side effects than other estrogens when administered at equivalent dose levels. Virtual absence of adverse side effects at effective dose levels is particularly advantageous in the treatment of the menopausal syndrome, where estrogens have to be administered in effective doses for prolonged periods of time. Such adverse side effects as nausea, vomiting, or gastrointestinal disturbances have made reduction of dosages or even cessation therapy mandatory, thus diminishing or even eliminating the amount of relief obtainable from estrogen therapy.

Sodium 17β-dihydroequilin sulfate may be administered orally or parenterally. For oral administration to humans, tablets or capsules are the preferred dosage form, although aqueous solutions of the compound may also be administered to animals. For parenteral administration aqueous solutions or suspensions in pharmaceutically acceptable vehicles such as, for example, vegetable oils, are the preferred dosage forms. Such dosage forms may contain from 0.1 to 1.0 mg. of sodium 17β-dihydroequilin sulfate each, and may be administered once a day for periods of time determined by individual requirements.

The following examples are illustrative of our invention.

EXAMPLE 1

Sodium equilin sulfate (50 g.) is dissolved in 250 ml. of water and a solution of sodium borohydride (36 g.) in water (204 ml.) and 10 percent sodium hydroxide (11.5 ml.) is added. The mixture is stirred at room temperature for 30 minutes and left overnight at room temperature. The pH is adjusted to 6-7 with 50 percent aqueous acetic acid with stirring and cooling, and the precipitate is redissolved by adding water. A solution of quinidine sulfate (58.4 g.) in water (2,500 ml.) is added slowly with stirring, and the mixture is left overnight at 4° C. The precipitate is filtered, washed with water, dried, dissolved in methanol (400 ml.) and 1N methanolic sodium hydroxide is added to pH 9.0. The mixture is left at 4° C. overnight and the precipitated quinidine is filtered and washed with a little methanol. The combined filtrate and washings are concentrated to a volume of 300 ml. and cold diethyl ether (10 liters) is added with cooling. After standing at 4° C. overnight the precipitate is filtered, washed with ether, and dried, to yield the title compound with m.p. 200° C. (dec.).

$\lambda_{max}^{methanol}$ 277.5, $\epsilon$ 923.

EXAMPLE 2

Sodium 17β-dihydroequilin sulfate (10.0 g.) is slurried with sufficient distilled water to make 33 ml. of a slurry. Anhydrous sodium acetate (10.0 g.) and anhydrous sodium citrate (10.0 g.) is added, thoroughly blended, and edible lactose (220.0 g.) is added and again thoroughly blended. The mixture is dried in a forced air drier at 40°-60° C. until a constant weight of 250.0 g. is reached, to obtain 250 g. of a premix containing 10.0 g. of sodium 17β-dihydroequilin sulfate.

In the same manner, by using 1.0 g., 2.0 g., 3.0 g. or 5.0 g. of sodium 17β-dihydroequilin sulfate, sufficient water to make 3.3, 6.6, 10 or 15 ml. of slurry respectively, 1.0 g., 2.0 g., 3.0 g. or 5.0 g. of anhydrous sodium acetate and anhydrous sodium citrate each and sufficient edible lactose to make the weight of the final product 250 g., premixes of 250 g. weight each are obtained containing 1.0 g., 2.0 g., 3.0 g. or 5.0 g. of sodium 17β-dihydroequilin sulfate each, respectively.

The premixes obtained above in the amounts of 250 g. each are milled together with edible lactose (2,122 g.), tricalcium phosphate (34 g.), polyethylene glycol 6,000 (70 g.), talc (17 g.), and magnesium stearate (7 g.), to provide 2,500 g. of a mixture which is compressed into tablets weighing 250 mg. each or filled into capsules in amounts of 250 mg. each, to make 10,000 tablets or capsules containing 1.0 mg., 0.1 mg., 0.2 mg., 0.3 mg., or 0.5 mg. of sodium 17β-dihydroequilin sulfate each, respectively.

EXAMPLE 3

Sodium 17β-dihydroequilin sulfate (1 g.) is dissolved in pyrogen-free water (990 ml.) containing sufficient sodium chloride or sodium citrate or glucose to make the solution isotonic, a preservative such as 0.1 percent weight by volume of Methylparaben and 0.015 percent by weight by volume of Propylparaben or 0.5 percent weight by volume of chlorbutanol is added, the solution is made up to 1,000 ml., sterilized by filtration, and filled into sterile ampuls or vials, to make a solution for parenteral administration containing 1.0 mg. of the active ingredient per milliliter.

In the same manner, but using 0.1, 0.2, 0.3, or 0.5 g. of sodium 17β-dihydroequilin and proceeding as above, solutions containing 0.1, 0.2, 0.3, or 0.5 mg./ml. of the active ingredient are also obtained.

EXAMPLE 4

Sodium 17β-dihydroequilin sulfate (10.0 g.) is obtained as a sterile solid by evaporation of a sterile aqueous solution. The sterile solid is mixed under sterile conditions with 970 ml. of sterile sesame oil and 15 ml. of sterile benzyl alcohol, and made up to 1,000 ml. with sterile sesame oil, to make a sterile suspension for parenteral administration containing 10.0 mg./ml. of the active ingredient, which is filled into sterile vials under sterile conditions.

EXAMPLE 5

Assay for Estrogenic Activity

This assay was performed with a mixture of equine conjugated estrogens ("Premarin") as the reference compound in a modified Allen-Doisy method.

Female rats (300 g. body weight) were ovariectomized. Three weeks later the rats were primed with estrone subcutaneously (2×7.5μg.) on two consecutive days. Vaginal smears were taken in the afternoon of the following day and in the morning of the next day. Rats with cornifed epithelial cells in the vaginal smears were given the test compound orally in water daily for 3 days, 1 week after priming. On the fourth day morning and afternoon, and the fifth day morning, vaginal smears were again taken. The $ED_{50}$ is expressed as the total dose at which 50 percent of the animals had cornifed epithelial cells and no leucocytes in the vaginal smears.

When carrying out the above assay with sodium 17β-dihydroequilin sulfate, the $ED_{50}$ was found to be 32-39 micrograms in the rat, and 5 micrograms in the mouse, while the mixture of equine conjugated estrogens ("Premarin") used as reference compound had $ED_{50}$ 100 micrograms in the rat and 4.5 micrograms in the mouse.

EXAMPLE 6

Assay for Uterotropic Activity

In a modification of the method described by Rubin et al., cited above, mice 23-25 days old were given orally once daily an aqueous solution of the compound to be tested dissolved in 0.1 ml. of water. Untreated controls were given 0.1 ml. of water in the same manner. Twenty-four hours after the last oral administration the animals were sacrificed, their uterine weights determined, after blotting on filter paper, and the dose causing an increase of 200 percent in uterine weight over the controls was calculated.

The same method was also used with rats 22-23 days old, and in this modification the dose causing an increase in uterine weight of 100 percent over control values was calculated.

When the above tests were carried out with sodium 17β-dihydroequilin sulfate and with a mixture of equine conjugated estrogens ("Premarin") side by side, it was found that the dose of the former compound increasing uterine weight in the mouse by 200 percent over control was approximately 8 micrograms, and the dose increasing uterine weight in the rat by 100 percent over control was approximately 4 micrograms, while the dose of the latter mixture giving the same effects was approximately 4 micrograms in the mouse and 2.82 micrograms in the rat.

EXAMPLE 7

Assay for Gonadotrophin Suppressant Activity

This activity was determined in parabiotic rats using the methods of Bunster and Meyer (1933) and Biddulph, Meyer and Grumbeck (1940). Sodium 17β-dihydroequilin sulfate was tested side by side with a mixture of equine conjugated estrogens ("Premarin").

Pairs of 38- to 39-day-old albino female litter mates were united by surgical attachment of the lateral skin abdominal muscles. One of the partners was spayed and given the test compound orally dissolved in 0.2 ml. of water daily for 10 days. The animals were killed and autopsied on the morning of the 11th day of the experiment.

Percentage ovarian inhibition was calculated according to Miyake (1961):

$$(100\ (V-C))/(V-V_1),$$

where $V$ = average ovarian weights of the intact partner united with the vehicle-injected spayed female;

$C$ = average ovarian weights of the intact partner united with the test-compound-injected spayed female; and $V_1$ = average weights of the intact partner united with the vehicle-injected intact female.

When carrying out the above assay with sodium 17β-dihydroequilin sulfate and a mixture of equine conjugated estrogens ("Premarin") side by side, the former compound was found to be more potent than the later mixture.

EXAMPLE 8

A 46-year-old woman with a diagnosis of premenopausal climacteric and moderately severe estrogen deficiency symptoms was treated with 0.5 mg. sodium 17β-dihydroequilin sulfate orally daily for 15 days (one cycle). The response was very satisfactory relief, with no symptoms reappearing during treatment and no signs of adverse side effects. Withdrawal bleeding occurred on the second day after termination of treatment. Endometrial biopsy before treatment showed a moderately developed endometrium of about 17 days, while a fully developed sectory endometrium of about 23 days was seen on the 15th day of treatment. Vaginal cytology was carried out for 12 consecutive days before starting treatment, and for 15 consecutive days during treatment, and showed a moderate degree of estrogen to be present before the start of treatment and full estrogenic response on the 14th day of treatment.

EXAMPLE 9

A 50-year-old woman with a menopause of 4 years' duration was treated for 15 days (one cycle) with 0.3 mg. of sodium 17β-dihydroequilin sulfate daily by the oral route. Estrogen deficiency symptoms before the start of treatment had been very severe and were essentially absent during treatment, but reappeared on the fifth day after the end of treatment. The only adverse effect observed during treatment was a mild heartburn. There was no withdrawal bleeding. Endometrial biopsy before start of treatment showed only mucous cells and free endometrial glands, but on the 17th day after the start of treatment small parts of the endometrium were found to be proliferating, with local hemorrhage and edema in the stroma and occasional mitosis. Vaginal cytology was carried out for 15 consecutive days before treatment, and on days 7 to 7 and 13 to 15 of the treatment period. Moderately low estrogenicity was seen before treatment, and a full estrogenic response on the 13th day of treatment was obtained.

EXAMPLE 10

A 44-year-old woman with a diagnosis of premenopausal climacteric was treated for six cycles of 20 days each with 0.2 mg. of sodium 17β-dihydroequilin sulfate orally per day. Estrogen deficiency symptoms had been moderate before the start of treatment and did not reappear after cessation of treatment. There were no adverse side effects, and withdrawal bleeding was slight. Endometrial biopsy before treatment showed a secretory endometrium of 23 days, and bundles of mucous cells and free endometrial glands on the 15th day of treatment. Vaginal cytology showed a moderate degree of estrogenic activity on the 11th day before the beginning of treatment, and a full estrogenic response on the 15th day of treatment.

EXAMPLE 11

A 53-year-old woman with a menopause of 3 years' duration was treated during one cycle for a period of 20 days with 0.5 mg. sodium 17β-dihydroequilin sulfate per day. Symptoms of estrogen deficiency had been very severe before treatment, and disappeared almost completely during treatment. There were no adverse side effects, and withdrawal bleeding occurred on the fifth day after cessation of treatment. Endometrial biopsy before start of treatment showed some clots and occasional fragments of endometrium with grandular hyperplasia and disintegration, and a proliferating endometrium with signs of mitosis in the grandular and epithelial layers accompanied by edema and dilation of the veins in the stroma.

EXAMPLE 12

A 44-year-old woman with a diagnosis of premenopausal climacteric was treated for one cycle with 0.1 mg. sodium 17β-dihydroequilin sulfate orally per day for a period of 30 days. Estrogen deficiency symptoms had been moderate before the start of treatment, disappeared almost completely during treatment, and did not recur after cessation of treatment. There were no adverse side effects, and withdrawal bleeding occurred on the 28th day. Endometrial biopsy before the start of treatment showed an endometrium in the secretory phase (23 days), and on the 25th day of treatment an endometrium in full proliferation was found, with abundant mitosis with an intensely congested and edematous stroma.

EXAMPLE 13

A 46-year-old woman with a diagnosis of premenopausal climacteric was treated orally during one cycle with 1 mg. daily of sodium 17β-dihydroequilin sulfate for a period of 20 days. Estrogen deficiency symptoms had been very severe before starting treatment, disappeared completely during treatment, and showed no recurrence after the end of the treatment period. Generalized pruritus was observed as a side effect, and withdrawal bleeding occurred on the fourth day after cessation of treatment. Endometrial biopsy before starting treatment showed a proliferating endometrium with a superficial and glandular epithelium containing superimposed nuclei and scarce signs of mitosis, as well as an edematous stroma with hemorrhagic foci and slight mitosis. On the 15th day of treatment an endometrium in full proliferation was found, with mitosis in the grandular epithelium and foci of disintegration in the stroma. Vaginal cytology was carried out for 15 consecutive days before starting treatment and showed a full estrogenic response from the 12th to the 15th day. During treatment, vaginal cytology was carried out from the fourth to the 19th day of treatment and gave equivocal results. Vaginal cytology was also carried out for the 2 days following cessation of treatment, with equally equivocal results.

EXAMPLE 14

A woman of 56 years with a menopause of 8 years' duration was treated during three cycles with oral doses of 0.5 mg. sodium 17β-dihydroequilin daily for a period of 15 days per cycle. Estrogen deficiency symptoms had been very severe before starting treatment, and disappeared completely during treatment. A slight recurrence was observed 8 days after cessation of treatment. Nausea and vomiting occurred as side effects on the 10th day of treatment, and withdrawal bleeding followed on the fifth day after cessation of treatment. Endometrial biopsy before starting treatment showed only aggregations of mucus, no endometrial tissue, and a similar picture was seen on the 19th day of the first cycle of treatment. However, on the 15th day of the third cycle of treatment a proliferating endometrium with intense edema of the stroma and abundant mitosis was found. Vaginal cytology was carried out for 15 consecutive days each before, during, and after treatment. No estrogen effects were seen before treatment, a satisfactory effect during treatment, and a full estrogenic response in the post treatment period.

EXAMPLE 15

A group of eight women ranging in age from 41 to 62 years with menopause of 1-10 years duration was treated orally for three cycles with 0.5 mg. sodium 17$\beta$-dihydroequilin sulfate daily for 21 consecutive days in each cycle. All women suffered from severe hot flushes and insomnia before starting treatment. Hot flushes disappeared in all patients after a few days of treatment and no later than the middle of the first cycle, and in four patients a recurrence of moderate hot flushes was seen towards the end of the treatment-free intervals. Vaginal cytology was carried out before starting treatment and showed substantial absence of estrogen in all patients. Vaginal cytology carried out during each week of treatment showed moderate to fair amounts of estrogen to be present. Minor withdrawal bleeding was seen in two patients in each cycle, and traces of withdrawal bleeding occurred in another two patients at the end of the first cycle but did not recur again. Endometrial biopsy was carried out in all patients after cessation of treatment. In six cases a proliferating endometrium was found, and in two cases no functional endometrium could be detected. Similar results were also obtained when five of the above patients were subsequently treated orally in the same manner with 0.625 mg. daily of equine conjugated estrogens ("Premarin").

We claim:

1. The method of treating the menopausal syndrome and symptoms associated therewith by estrogen therapy which consists of administering to the patient, as the sole estrogenic agent, sodium 17$\beta$-dihydroequilin sulfate.

2. The method of treating the menopausal syndrome and symptoms associated therewith by estrogen therapy which consists of administering to the patient, as the sole estrogenic agent, sodium 17$\beta$-dihydroequilin sulfate, said sodium 17$\beta$-dihydroequilin sulfate being administered in daily dosages ranging from 0.1 mg. to 1.0 mg.

3. The method of treating the menopausal syndrome and symptoms associated therewith by estrogen therapy which consists of orally administering to the patients undergoing said menopausal syndrome a pharmaceutical composition which includes sodium 17$\beta$17$\beta$-dihydroequilin sulfate as the sole estrogenic agent thereof, said pharmaceutical composition being orally administered in daily dosages ranging from 0.1 mg. to 1.0 mg. of sodium 17$\beta$-dihydroequilin sulfate.

4. The method of treating the menopausal syndrome and symptoms associated therewith by administration of estrogenic agents which consists of administering to human patients undergoing said menopausal syndrome a pharmaceutical composition which contains sodium 17$\beta$-dihydroequilin sulfate as the sole estrogenic medicament thereof.

5. The method of claim 4 wherein said sodium 17$\beta$-dihydroequilin sulfate is orally administered.

6. The method of claim 4 wherein said sodium 17$\beta$-dihydroequilin sulfate is parenterally administered.

7. A pharmaceutical composition for treatment of the menopausal syndrome and associated symptoms which contains, as its sole estrogenic agent, sodium 17$\beta$-dihydroequilin sulfate, said sodium 17$\beta$-dihydroequilin sulfate being associated with a pharmaceutically acceptable carrier therefor.

8. A pharmaceutical composition for the treatment of the menopausal syndrome and associated symptoms which contains, as its sole estrogenic agent, sodium 17$\beta$-dihydroequilin sulfate, said composition being associated with a pharmaceutically acceptable carrier and being present in said pharmaceutical composition in amounts ranging from 0.1 mg. to 1.0 mg.

9. The pharmaceutical composition defined in claim 7 wherein said pharmaceutically acceptable carrier is a solid, and said pharmaceutical composition is in the form of tablets or capsules.

10. The pharmaceutical composition as defined in claim 7 wherein said pharmaceutically acceptable carrier is a vegetable oil.